W. Harris,
Rolling Tires,
N° 36,953. Patented Nov. 18, 1862.

Witnesses
D. W. Stetson
Wm B Smith

Inventor
William Harris

UNITED STATES PATENT OFFICE.

WILLIAM HARRIS, OF JERSEY CITY, NEW JERSEY.

IMPROVEMENT IN MACHINES FOR ROLLING TIRES.

Specification forming part of Letters Patent No. 36,953, dated November 18, 1862.

*To all whom it may concern:*

Be it known that I, WILLIAM HARRIS, of Jersey City, in the county of Hudson and State of New Jersey, foreman blacksmith in the Jersey City Locomotive Works, have invented a certain improvement in the final rolling of tires; and I do hereby declare that the following is a full and exact description thereof, reference being had to the accompanying drawings and the letters of reference marked thereon, in which—

Figure 1:
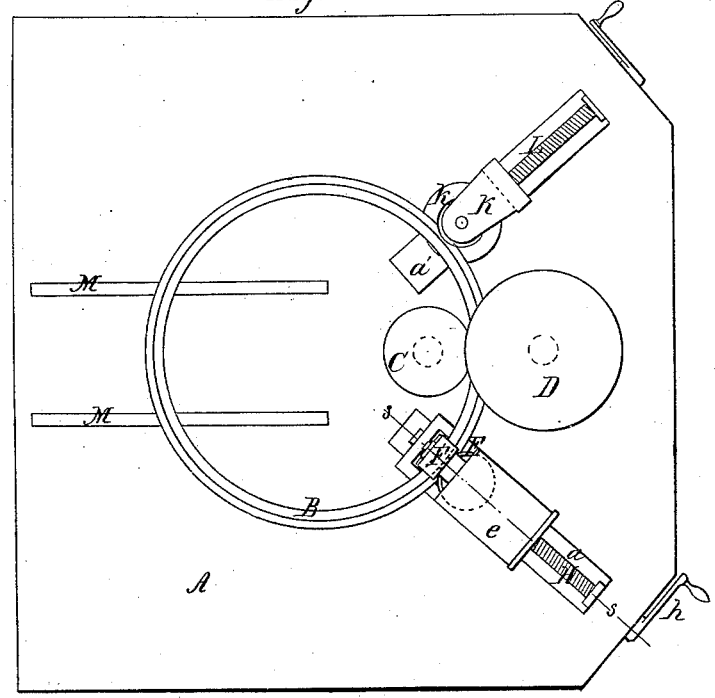
Figure 3:
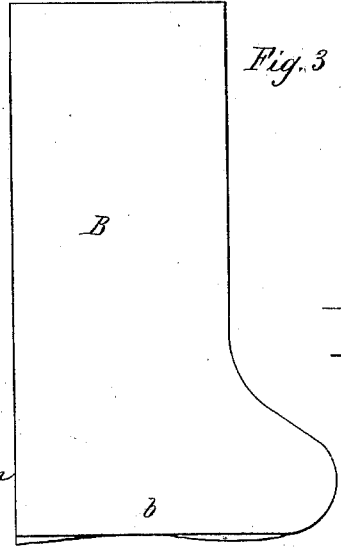
Figure 2:
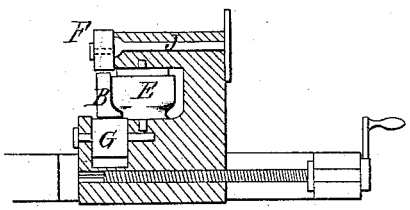

Figure 1 is a plan view showing a tire in the act of being rolled. Fig. 2 is a vertical section of a carriage and rollers, taken on the line S S in Fig. 1. Fig. 3 is a section of a finished tire on a larger scale, the black lines showing the form given by the rolling process as conducted previously to my invention and the red outline the form given by my invention.

Similar letters of reference indicate like parts in all the drawings.

Referring to the drawings, it will be seen that my machine is identical with that ordinarily employed for the final rolling of tires, except in the carriage $e$.

The stationary top flooring or bed of the machine is indicated by A.

The heated tire is shown in red outline by B, suitable for a small-sized driving-wheel for a locomotive.

C is the plain cylindrical roller, which acts on the inside of the tire.

D is the roller, properly flanged and grooved, which acts on the outside or periphery of the tire. These are driven by powerful gearing beneath, and give motion to the tire, so as to bring all parts successively and repeatedly within their influence, as indicated by the arrows.

$e$ is a stout carriage supporting two horizontal rolls, F and G, both of which are free to turn with the motion of the tire.

F acts on the upper or narrow face of the tire, and G on the lower or broad face. A third roller, E, mounted vertically on $e$, is properly shaped to apply to the outer face of the tire, and, being also free to turn, serves simply as a guide or lateral support. The carriage $e$ is so fitted within the radial slot $a$ in the bed A that it may be moved outward or inward by the screw H, which latter is turned by the handle $h$. The metal of the carriage $e$ is extended around so as to form a substantial support for the roller G both at its inner and outer ends, and it may be provided with any convenient means (not represented) for raising and lowering this roller at will, or for changing the line of the axis thereof in operating on larger or smaller tires. The upper roller, F, cannot so well be supported at both its ends, because its inner bearing, if such were provided, would tend to obstruct the introduction and removal of the tire.

F is mounted loosely on a stout shaft, J, which shaft may be turned partly around in its bearing in the carriage $e$. The projecting end of J, which carries the roller, is slightly cranked or eccentric, so that a partial turning of J in $e$ raises or lowers F, and thus rolls down or compresses the tire B more or less, as he may desired. Another carriage, K, is mounted in another slot, $a'$, and provided with an adjusting-screw, L. It has a single vertical roller, $k$, acting upon the outer face only of the tire. The roller $k$ differs from the vertical roller E in having a broad flange at its base to bear the under face of the tire. There may be other slots in A in addition to $a$ and $a'$, and more of such carriages K, and vertical rollers with means of adjustment; but they are not absolutely necessary, because the bearing-rails M M may serve sufficiently to support those portions of the tire opposite to D $e$ K. The upper surface of the roller G and of the lower or supporting flanges of D and K and of the bearing-rails M M should be at about the same level, but it is well to have the upper side of the roller G about one sixteenth of an inch higher than the other supports named.

To operate my invention, it is necessary that the tire should be previously rolled nearly to the proper size and welded. It is then heated, and the roller D and the carriages $e$ and K are moved outward upon A. The tire is then placed in position, and the roller D and the carriages $e$ and K are moved inward until the several rollers are in contact with the tire.

As the work proceeds the roller D is by suitable gearing or screws (not represented,) pressed nearer and nearer to the roller C, and the carriages $e$ and K are moved gradually backward or outward until the tire is found to be sufficiently enlarged, the roller F being all the while acting upon the upper face thereof, and roller G being all the while acting on the lower face thereof, in the manner and with the effect which is obvious.

The advantage due to the use of my invention is that the tire is practically perfect on its edges as well as on its outer and inner faces when it is ready to be removed from the machine, and that no extra labor is required or difficulty experienced in adjusting the rollers in consequence of change of dimensions of the tire as the rolling proceeds.

When both or either of the edges of the tire are shaped by flanges on vertical rollers, instead of being shaped, as in my invention, by horizontal rollers, the surfaces are liable to be rough and imperfect. The superior effect of my invention, as compared with such, is due to the fact that in my invention the surfaces of the tire are acted on by surfaces having a motion coinciding perfectly therewith during the period of their brief contact, while in the other case the edges of the tire are acted on by surfaces having an obviously different motion, each point in a flange so sweeping around as tends to produce and in fact does actually produce a series of curved lines or scratches on the tire, involving a liability to leave the surface very irregular and imperfect. When the edges of tires are finished in this imperfect manner, they are found in practice to be not only rough, but hollow, as shown by the black line across the broadest edge in Fig. 3, and the imperfection of the operation is so great as to sometimes render it almost impossible to make the general outline of the tire circular.

The English patent of John George Bodmer, dated December 8, 1842, shows a horizontal roller working on the edge of a tire with a view to avoid the difficulties above enumerated; but in Bodmer's invention the edge roller or rollers were so related to the main rollers, or those which shape the outer and inner sides of the tire, as to interfere with the adjustment of each to produce tires of different breadths and thicknesses.

My invention differs from Bodmer's in the fact that my edge-rollers F G are mounted on the same adjustable carriage with the guide-roll E, and are therefore moved therewith and necessarily adjusted aright without either limiting the extent of the motion of any rolls or requiring any extra adjustment for the purpose of adapting their position to the varying diameter of the tires.

Having now fully described my invention, what I claim as new therein, and desire to secure by Letters Patent, is—

The combination and arrangement of the rollers G, E, and F in the adjustable carriage e, substantially as and for the purpose herein described.

In testimony whereof I have hereunto set my name in the presence of two subscribing witnesses.

WILLIAM HARRIS.

Witnesses:
JOHN H. ROBERTS,
WM. H. MARSH.